June 9, 1964   B. E. O'CONNOR   3,136,178
CRANKSHAFT DAMPER
Filed March 9, 1962   2 Sheets-Sheet 1

INVENTOR.
BERNARD E. O'CONNOR
BY Fulwider Mattingly & Huntley
ATTORNEYS

June 9, 1964  B. E. O'CONNOR  3,136,178
CRANKSHAFT DAMPER
Filed March 9, 1962  2 Sheets-Sheet 2
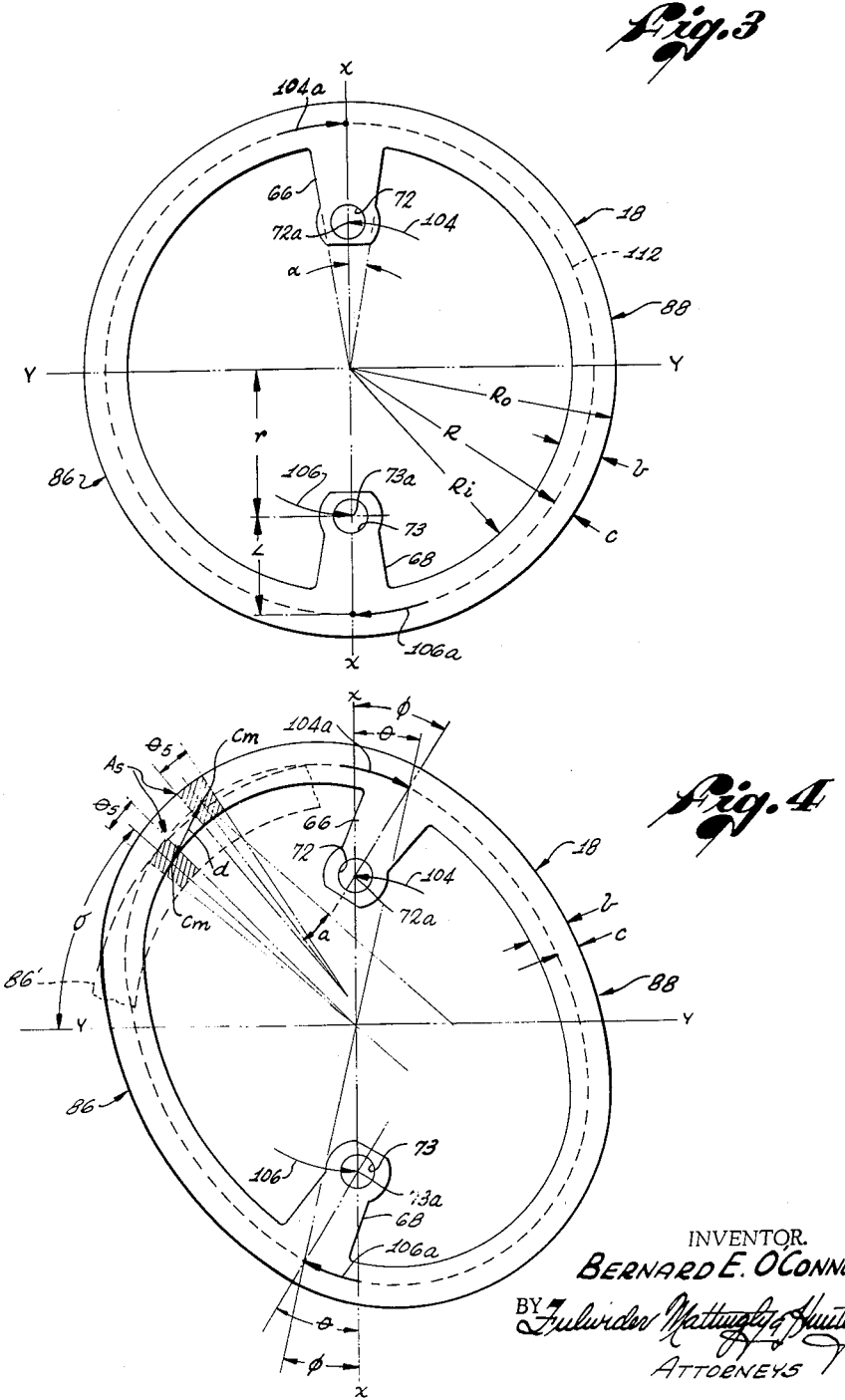
INVENTOR.
BERNARD E. O'CONNOR
BY Fulwider Mattingly Huntley
ATTORNEYS

United States Patent Office 3,136,178
Patented June 9, 1964

3,136,178
CRANKSHAFT DAMPER
Bernard E. O'Connor, Playa Del Rey, Calif., assignor to Lionel-Pacific, Inc., Gardena, Calif., a corporation of Delaware
Filed Mar. 9, 1962, Ser. No. 178,736
16 Claims. (Cl. 74—574)

This invention relates to improvements in torsional vibration dampers, and particularly to torsional vibration dampers for crankshafts of internal combustion, reciprocating piston type engines.

It is well known that elongated shafts of elastic material, when subjected to intermittent or periodic torsional impulses, tend to be excited into torsional oscillation or vibration. For example, crankshafts of modern high speed internal combustion engines by reason of their complex forms and distribution of weights are known to have so-called natural periods of torsional vibration at which the amplitude of vibration may become disagreeable, if not excessive or even destructive, when the periodic torsional impulses applied by the piston and connecting rods at certain engine speeds synchronize in frequency with such periods of vibration.

Vibration dampers of the before mentioned kind, to be desirably effective, must be of such character as to offer maximum opposition to vibration and cause maximum dissipation of the vibratory energy of the shaft at one or more particular frequencies at which the amplitude thereof otherwise tends to build up to maximum values. Heretofore, torsional vibration dampers have been designed which employ the general principle of frictionally coupling to the shaft a torsional intertia mass, such as a flywheel device, which by reason of its rotational inertia resists rapid rotational accelerations and thereby applies to the shaft through such frictional coupling a frictional braking effect which dissipates a sufficient amount of the torsional vibratory energy to suppress the build-up of the amplitude of torsional vibrations.

For such a damper system to be completely effective for all torsional vibration frequencies and amplitudes, the torsional inertia mass would be required to have an impractically great rotational inertia. With inertia masses or flywheels of practical size and weight, the frictional coupling thereof to the shaft can only be adjusted such that the braking slippage occurs at a predetermined combination of frequency and amplitude of shaft vibration. Thus, if the frictional coupling is adjusted for optimum energy dissipating slippage at a particular high frequency, high amplitude condition, it may not slip at all at lower frequencies and amplitudes. Conversely, if the frictional coupling is adjusted for optimum energy dissipating slippage at a particular low frequency, low amplitude condition, it may slip too easily at higher frequency and amplitude conditions. Thus, with the aforesaid frictionally coupled torsional mass system, any such chosen adjustment must always be a more or less imperfect compromise, unless either the degree of the frictional coupling or the effective rotational inertia of the flywheel mass can be automatically varied as needed, while the damper mechanism is in operation.

Heretofore, such automatic variation of the characteristics of the damper mechanism has been attempted by providing means for varying the slippage friction of the frictional coupling in accordance with a function of the speed of rotation of the shaft. This has not proven satisfactory for the apparent reason that the coefficient of friction characteristics of the braking materials available for the frictional coupling means, and the variation of the forces with variation of shaft speed available for application to such frictional coupling, have not resulted in braking effect functions which meet the required range of varying conditions of torsional vibration frequency and amplitude.

Also, heretofore, various means have been attempted for modifying the effective inertia of the rotational mass of the damper in accordance with requirements, some of such means involving the use of resiliently suspended torsional inertia masses or flywheels in which the combination of mass and resiliency was such as to impart a resonant frequency of torsional oscillation to the damper which is the same as at least one of the frequencies of torsional vibration of the shaft to be suppressed. Thus, the opposition to torsional vibration of the shaft by the rotational mass would become greatly increased at their mutually resonant frequencies.

This latter system has proved to be unsatisfactory apparently because of the absence, heretofore, of any practical resonant rotational mass mechanism which would adequately meet the necessary frequency and braking force requirements. Furthermore, insofar as is known by the inventor, every such resonant damper system has attempted to employ resilient coupling means for the rotating inertia mass in the form of springs of more or less conventional design, in which it was found impracticable to embody both the necessarily high spring force coefficients and the necessary resistance to fatigue failure.

Accordingly, it is an object of this invention to provide a torsional vibration damper of improved effectiveness and durability.

It is also an object of this invention to provide a torsional vibration damper capable of being tuned to offer maximum inertial resistance to torsional vibration of a chosen frequency.

It is another object of this invention to provide a torsional vibration damper capable of being adjusted to dissipate maximum torsional vibratory energy at a chosen frequency.

The objects of this invention are attained, in general, by a torsional vibration damper system which comprises, in brief, an inertia mass adapted to be carried upon and frictionally coupled to a shaft subject to torsional vibration, the friction of the coupling through which the torsional vibrations of the shaft are transmitted to the inertia mass being adjustable and the inertia mass being tuned to have within itself a natural period of torsional oscillation resonating with the frequency of torsional vibration of the shaft to be suppressed. An important feature of this invention resides in the construction of the inertia mass, whereby it is in effect torsionally, resiliently coupled to the shaft, such effective resiliency being accomplished by constructing the inertia mass in the form of a resilient annulus, to which the torsional vibration of the shaft is applied in the form of a vibratory force couple which tends to introduce vibratory bending or distortion in such annulus transverse to its circumference. Thus, the annular inertia mass acts as both the inertia mass and its own resilient suspension, whereby the required high elastic suspension forces are attained by means in which the resultant stresses are relatively low and, hence, the fatigue life thereof is greatly extended.

These and other objects, advantages, and features of novelty will be evident hereinafter.

In the drawings which illustrate the presently preferred embodiment and mode of operation of the invention, and in which the same or similar reference characters designate the same or similar parts throughout the several views:

FIGURES 3 and 4 are diagrammatic views, illustrating in exaggerated form the mode of vibratory flexure of the inertia mass of the damper apparatus of the invention.

Apparatus

Figure 1:
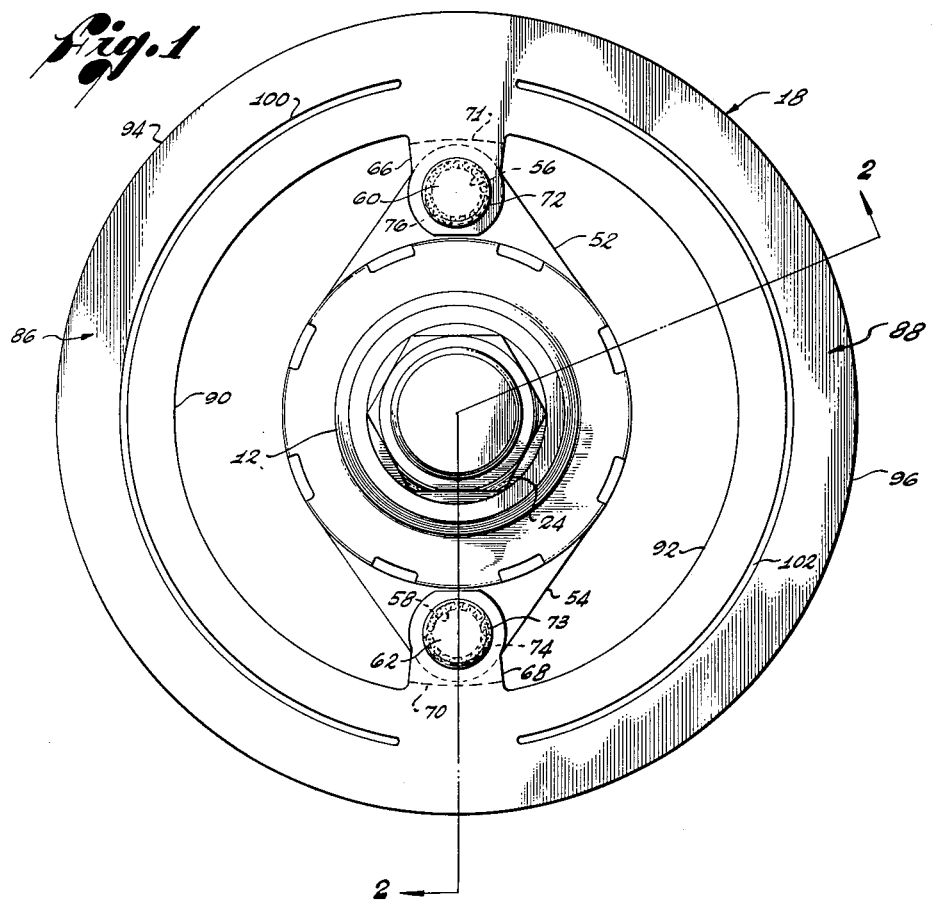
FIGURE 1 is an end elevational view of the damper apparatus assembly of the invention.
Figure 2:
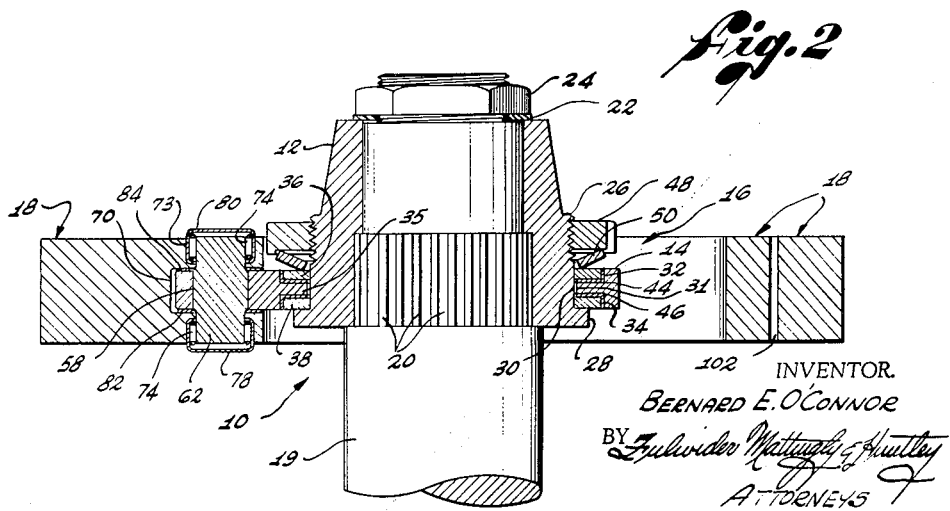
FIGURE 2 is a sectional elevational view taken on line 2—2 of FIGURE 1.

Referring first primarily to FIGURES 1 and 2 of the drawings, the principal components of the torsional vibration damper system, indicated as a whole at 10, include a central hub 12, a generally annular shaped drive coupling member 14 coaxially rotatably mounted upon said hub, a friction drive clutch mechanism indicated generally at 16 located coaxially intermediate and interconnecting the hub 12 and the drive coupling member 14, and an outer, generally annular shaped, torsional inertia member or flywheel body 18, coaxially mounted upon said drive coupling, all such components being constructed and assembled together as hereinafter more fully described.

The hub 12 is adapted to be secured to the end of a shaft 19 such as, for example, an engine crankshaft in which torsional vibrations are to be suppressed, by means of a splined or keyed interconnection 20 which is retained in firm interengagement by means of a nut 24 threaded on the end of the shaft and acting through the washer 22 against the outer end of the hub. The exterior maximum diameter portion of the hub 12 is formed at one end prtion thereof with an exteriorly threaded section 26, a radially outwardly extending annular end flange 28 at the opposite end portion thereof, and a generally cylindrical bearing section 30 intermediate the threaded portion 26 and flange 28.

Rotatably supported coaxially about the bearing section 30 of the hub 12 is the before mentioned coupling member 14, which is provided with a concentrically surrounding central bore 31. The bore 31 of the coupling member 14 is counterbored at axially opposite ends thereof forming in effect thereby a pair of longitudinally outwardly facing, concentric, annular grooves 32 and 34, separated by an intermediate annular web portion 35. The before mentioned friction drive clutch mechanism 16 located between the coupling member 14 and the hub 12 includes a pair of annular brake rings 36 and 38 which make rotatable nesting engagement with the annular grooves 32 and 34, respectively. The bores of each of the brake rings 36 and 38 are concentrically supported upon the bearing section 30 of the hub 12. In suitably provided clearance spaces between the brake rings 36 and 38 and the adjacent surfaces of the annular recesses 32 and 34 of the coupling member 14 and preferably bonded to the latter surfaces, are relatively thin layers of friction material, as shown at 44 and 46, such friction material preferably having been bonded to the coupling member groove surfaces with the brake rings 36 and 38 pressed in place therein, to insure precise fit and alignment of these several components. A number of well known brake lining materials may be used for this purpose. A material which has been found particularly suitable is Fabroid or Fibreglide, which are trade names for frictional materials manufactured under license to American Metal Products Company and believed to consist of interwoven Teflon and glass fibers molded together with a phenolic plastic binder and containing some intermixed graphite.

An annular friction adjusting nut 48 is threadedly retained upon the before mentioned externally threaded section 26 of the hub 12. Retained between the friction adjusting nut 48 and brake ring 36 is a generally annular shaped, Belleville type spring 50. By adjustment of the longitudinal position of the friction adjusting nut 48 on the threads 26, the Belleville spring 50 is placed under longitudinal compression, the resultant force of which is applied longitudinally to the adjacent brake ring 36 and thence through the layer of friction material 44, through the intermediate annular web portion 35 of the coupling member 14, through the friction material 46 and finally from there through brake ring 38 to the hub flange 28. The metal-to-metal coefficient of friction between the nut 48, Belleville spring 50, and brake ring 32 and also between the brake ring 38 and the hub flange 28 is greater than that between the friction material layers 44 and 46 and the contacting surfaces of brake rings 36 and 38. Therefore, in operation, the brake rings will be held stationary with respect to the hub 12 with all such slippage as takes place occurring between the brake rings 36 and 38 and the coupling member 14. An adjustable frictional brake-like coupling between the hub 12 and the coupling member 14 is thus provided.

The coupling member 14 is formed with a pair of integral, diametrically opposite, outwardly extending spokes 52 and 54, which are preferably of such dimensions as to have great stiffness in bending in a direction parallel with the plane of rotation of the coupling member and the annular inertia member. Each of the spokes 52 and 54 is provided adjacent the outermost ends thereof with axial holes 56 and 58 through each of which is press fitted a pivot bearing pin, as shown at 60 and 62, respectively.

Supported coaxially about the hub 12 and coupling member 14 is the before mentioned, generally annular shaped inertia member or flywheel body 18. This inertia member 18 is formed with a pair of integral, diametrically opposite, inwardly extending lug members 66 and 68, which are also dimensioned to have great stiffness in bending in a direction parallel with the plane of rotation of the inertia member. Each of such lug members 66 and 68 are formed with an intermediate, inwardly extending, radial groove or bifurcation, as shown at 70 and 71, to receive therein the before mentioned outwardly extending spokes 52 and 54 of the coupling member 14. Each of the bifurcated portions of the lug members 66 and 68 are provided with holes 72 and 73 which make coaxial alignment with the before mentioned holes 56 and 58 in the spokes 52 and 54. The bearing pins 60 and 62 extend coaxially from the before mentioned holes 56 and 58 in spokes 52 and 54 into the holes 72 and 73 of the lug members 66 and 68 and are tightly, but pivotally retained therein by means of needle bearings, as shown at 74 and 76.

Protective end covers 78 and 80 are preferably incorporated in each of the needle bearing assemblies, and annular spacer washers 82 and 84 are also provided intermediate the outer surfaces of the spokes 52 and 54 and the adjacent inner surfaces of the bifurcated portions of the lug members 66 and 68 surrounding the bearing pins 60 and 62.

The before mentioned annular inertia member shown as a whole at 18, is a generally ring shaped body formed of two integral, diametrically opposite, arcuate, or semicircular portions 86 and 88. The arcuate portions 86 and 88 are formed with inner diametral or arcuate surfaces 90 and 92, respectively, and outer diametral or arcuate surfaces 94 and 96, respectively, which preferably although not necessarily, are cylindrical in form, having common centers of curvature coincident or in line with the longitudinal axis of the hub 12. The diametrically opposite ends of each of the arcuate portions 86 and 88 of the inertia member 18 are integrally joined together to form a single unit integral with the lug members 66 and 68. The thickness of the annular inertia member 18 between the inner and outer diameter surfaces thereof is preferably such that the arcuate portions 86 and 88 thereof will have predetermined degrees of stiffness and resiliency in bending transverse to their peripheries or circumferences or, in other words, will have predetermined degrees of stiffness and resiliency transverse to the circumferential neutral axis of the annular mass. In some cases, it may be desirable to provide elongated arcuate slots, as shown at 100 and 102, in the arcuate portions 86 and 88 of the inertia member, located intermediate the inner and outer diametrical surfaces thereof to impart predetermined resilient stiffness in bending thereto without substantial sacrifice of rotational mass and inertia. Although only one slot is shown in each of the arcuate portions 86 and 88 of the inertia member 18, two or more such slots arranged concentrically may be used as needed to obtain the required stiffness or flexibility. The radial positions of such slots are preferably such as, in operation, to result in substantially equal maximum bending stresses in the several resultant concentric arcuate portions of the inertia member.

Materials which have been found suitable for the inertia member 18 are cast iron, steel, and the like heavy resilient metals. Mechanite, which is a trade name for a well known high grade cast iron, is particularly suitable.

*Operation*

Referring now principally to FIGURES 3 and 4, the mode of operation of the before mentioned damper apparatus is substantially as follows.

In FIGURES 3 and 4, in which the outer annular inertia member and its integral inwardly extending supporting lugs are shown more or less diagrammatically, 18 represents the hereinbefore described annular inertia member as a whole, 86 and 88 the diametrically opposite arcuate halves of such inertia member, 66 and 68 the diametrically opposite inwardly extending inertia member supporting lugs, and 72 and 73 the pivotal spoke attachment bearings in such lugs 66 and 68, respectively. FIGURE 3 represents the shape of the annular inertia member 18 and positions of the lugs 66 and 68, as they appear either under static conditions or at an instant under dynamic conditions when such assembly is not distorted in shape by reason of the application thereto of rotational acceleration forces. Arrows 104 and 106 represent tangential forces which are applied at the attachment bearing points 72 and 73, and arrows 104a and 106a represent equal and opposite inertia forces of the annular inertia mass 18, resulting from torsional accelerations transmitted thereto from the shaft under dynamic conditions. Such forces 104 and 106 and opposite forces 104a and 106a set up force couples or bending moments in the lug members 66 and 68 which rotate them each through a small angle $\phi$ about said centers 72 and 73, such rotation being permitted by and resulting in elastic deformation or distortion of the annular inertia member 18, as illustrated diagrammatically in FIGURE 4. The portion of the rim 86, shown superposed in dotted lines at 86′ in FIGURE 4, corresponds with its undeflected shape, as shown in FIGURE 3, and illustrates the relative flexual displacement of the rim between the unflexed and flexed conditions, respectively.

For each half cycle of the applied torsional vibrations, the direction of the forces represented at 104 and 106 and at 104a and 106a of FIGURE 3 are reversed, resulting in an effect which is the reverse of that just described, thereby causing the annular inertia member 18 to be elastically distorted in a direction opposite to that shown in FIGURE 4. Such distortions of the structure swing periodically from one such extreme to the other extreme for each half cycle of such applied torsional vibration.

From the foregoing, it will be apparent that the effect of such periodic distortions of the annular inertia body will be that of an annular inertia mass which is spring-coupled to the central driving member, the spring being constituted in the annular member 18 itself. Thus, in effect, a massive and extremely stiff spring suspension is incorporated in the massive torsional inertia member, and the otherwise usual requirements for separate spring or resilient parts are eliminated.

When the natural period of vibration of the annular inertia member structure 18, diagrammatically illustrated in FIGURES 3 and 4, is made such that it resonates with the frequency of vibration of the shaft upon which the whole apparatus is mounted, the amplitude of alternating distortions of the annular member 18 tends to build up to a maximum value. Upon such building up of the amplitude of alternating distortional vibrations of the annular inertia member 18, a maximum transfer of vibratory energy from the driving shaft 2 to the inertia member 18 takes place and such transfer of energy is effected through the hereinbefore described friction clutch member mechanism 16. With the friction drive clutch mechanism 16 adjusted such that it will slip at each half cycle of each such torsional vibration or oscillation acceleration force transferred therethrough, a maximum amount of energy is dissipated therein in the form of heat, and in effect the natural period of torsional vibration of the rotating shaft or other rotating body to which the damper is attached is thereby modified. Thus, under the latter conditions, a maximum amount of vibratory energy will be dissipated, thereby substantially suppressing the torsional vibrations.

By mathematical computation or by empirical methods or a combination of both, the thickness, flexibility, and weight of the annular inertia member 18 and the length of the lugs 66 and 68 and positions of the pivot points thereof may be so designed as to impart a predetermined period of torsional oscillation or vibration thereto.

The period of frequency of torsional oscillation of a generally annular inertia member of the kind of construction herein described comprising the annular body 18 and integral lug members 66 and 68 may be computed with sufficient accuracy for practical purposes as follows.

With reference again to FIGURES 3 and 4, the dimensional nomenclature employed in the computation is as follows:

$A_s$ = Any arbitrary sector of the rim (see FIGURE 4).
$a$ = The rotational angular deflection of a sector $A_s$ about it mass center $C_m$.
$b$ = The thickness of the rim assuming it to be rectangular in cross section, as herein illustrated.
$c$ = The distance from the neutral axis (112) of the rim 18 to its extreme outer fiber.
$L$ = The distance from the lug pivot point (72a or 73a) to the neutral axis (112) of the rim 18.
$R$ = The distance from the center of the hub to the neutral axis (112) of the rim 18.
$R_o$ = The outside radius of the rim 18.
$R_i$ = The inside radius of the rim 18.
$r$ = The distance from the center of rotation of the hub 12 to the pivot point (72a or 73a) of a lug ($r = R - L$).
$x$ = A generalized coordinate of a discrete particle in the rim for motion parallel to the coordinate line $x$—$x$, which line intersects the pivot points 72a and 73a of the two lugs 66 and 68.
$y$ = A generalized coordinate of a discrete particle in the rim for motion perpendicular to the coordinate line $x$—$x$.
$d$ = distance of translation of the center of mass of the sector $A_s$ between deflected and undeflected conditions of the rim ($d = \sqrt{x^2 + y^2}$) (see FIGURE 4).
$\alpha$ = One half of the angle subtended at the center of the hub by the intersection of the projected sides of the lugs (66 or 68) and the inner radius ($R_i$) of the rim in the plane of rotation.
$\phi$ = The angular motion of a lug 66 or 68 about its pivot point 72a or 73a.
$\sigma$ = The angle measured about the center of the hub between the Y—Y axes and a line passing through the center of the hub and the center of mass $C_m$ of the sector $A_s$ when the rim is in an undeflected condition.
$\theta$ = The reference angular deflection included between a radial line passing through the center of the hub and the pivot point of a lug, and another line passing through the center of the hub and the point of intersection of the center line of the lug with the neutral axis of the rim (at R).
$\theta_s$ = The included angle of the sector $A_s$.

Additional physical quantity nomenclature employed in the computations is as follows:

$E$ = The modulus of elasticity in tension of the material of the rim.
$I_e$ = The effective polar mass moment of inertia of the rim mass.
$I$ = The area moment of inertia of the rim cross section about its neutral axis (112) which $\approx \frac{1}{12} b(R_o - R_i)^3$ for a rectangular section, as shown.
$I_s$ = The polar mass moment of inertia of a sector of the rim about its centroid.
$I_1$ = The effective mass polar moment of inertia of the rim due to linear motions of the centers of mass of the sectors $A_s$ in one quadrant.
$I_2$ = The effective mass polar moment of inertia of the rim due to angular motions about the centers of mass of the sectors $A_s$ in one quadrant.
$I_3$ = The effective mass polar moment of inertia of a lug (66 or 68) in one quadrant.
$K$ = The effective torsional spring constant of the rim.
$M$ = The mass of a discrete particle of the rim.
$M_s$ = The mass of the rim within the sector $A_s$.
$S$ = The maximum bending stress in the rim mass.
$T$ = The torque applied to the inertia mass.
$W$ = Weight density of the inertia rim mass material.

$x_\theta = x$ as a function of $\theta$; $x_\theta = \frac{x}{\theta}$ $y_\theta = y$ as a function of $\theta$; $y_\theta = \frac{y}{\theta}$ $a_\theta = a$ as a function of $\theta$; $a_\theta = \frac{a}{\theta}$ $g$ = The acceleration of gravity.

The following solution for natural frequency of torsional oscillation, Wn, of the before mentioned annular inertia member is rigorous within the limitations imposed by the assumptions that:

$$\sin \phi = \tan \phi = \phi, \text{ that } \cos \phi = 1$$

and that the shape of the dynamic deflection curve is the same as the shape of the static deflection curve.

$$Wn = \sqrt{\frac{K}{I_e}}$$

where $$K = \frac{16 \, EI \, (R-L)^2}{L^2 R (\pi - 2\alpha - \sin 2\alpha)}$$

$$I_e = \sum M(x_\theta^2 + y_\theta^2)$$

and for the entire mass of the annular inertia assembly 18, $$\frac{S}{\theta} = \frac{cK \cos \alpha}{4I\left(\frac{R}{L} - 1\right)}$$

The foregoing expressions for K and S may be readily evaluated by substitution of the proper parameters.

The expression for $I_e$ is a precise statement for which a practical evaluation may be made as follows.

$$I_e = 4(I_1 + I_2 + I_3)$$

where $$I_1 = \sum M_s(x_\theta^2 + y_\theta^2)$$

from $$\sigma = \left(\frac{\pi}{2} - \alpha\right) \text{ to } \sigma = 0$$

Here $M_s$ is the mass of the rim 18 within a sector $A_s$ and $x_\theta$ and $y_\theta$ are taken at the mass centroid of the same sector.

$$x_\theta = \frac{R}{L}\left[R \cos \sigma - \frac{4(R-L)[\cos^2 \sigma + \frac{1}{2}\sin^2 \sigma - (\sin \alpha \cos \sigma + \frac{1}{2}\cos^2 \alpha]}{\pi - 2\alpha - \sin 2\alpha}\right]$$

$$y_\theta = \frac{R}{L}\left[(R-L) - R \sin \sigma - (R-L)\left[1 + \frac{4 \sin \sigma \sin \alpha - (2\sigma + \sin 2\sigma)}{\pi - 2\alpha - \sin 2\alpha}\right]\right]$$

$$I_2 = \sum I_s a_\theta^2 \text{ from } \sigma = \left(\frac{\pi}{2} - \alpha\right) \text{ to } \sigma = 0$$

$$I_s = \frac{bW\theta_s}{2g}\left[\frac{1}{2}(R_o^4 - R_i^4) - \frac{16 \sin^2 \frac{\theta_s}{2}(R_o^3 - R_i^3)^2}{9\theta_s^2(R_o^2 - R_i^2)}\right]$$

$$a_\theta = \frac{R}{L} - \frac{4(R-L)[\cos \sigma - \sin \alpha]}{L(\pi - 2\alpha - \sin 2\alpha)}$$

$$I^3 = \frac{bw\alpha}{2g}\left[\frac{1}{2}(R_o^4 - r^4) - \frac{4r(R_o^3 - r^3)\sin \alpha}{3\alpha} - \frac{r^2}{R_o^2 - r^2}\right]\frac{R^2}{L^2}$$

In the solution of the foregoing relationships in the derivation and design of a damper system of the desired mass, stiffness, and natural period, it is necessary to substitute for the various unknown quantities therein, various assumed values. With a number of such trial and error solutions, a design trend can be observed from which an acceptably accurate solution can finally be obtained.

In the foregoing computations, the before mentioned arcuate slots 100 and 102 in the rim 18 have been assumed to be omitted. However, as before mentioned, where it is necessary to modify the flexibility of the resilient arcuate portions 86 and 88 of the annular inertia member 18 to obtain the desired predetermined vibratory characteristics and allowable stresses, arcuate slots such as shown at 100 and 102 may be formed therein. In general, when such arcuate slots are included in the inertia member 18, the computations are carried out in the same manner as hereinbefore described, except each concentric annular portion of the annular mass of rim 18, separated by the arcuate slots, are treated as separate annular inertia masses.

It is to be understood that the foregoing is illustrative only and that the invention is not limited thereby, but includes all modifications thereof within the scope of definition of the appended claims.

What is claimed is:

1. A torsional vibration damper for a rotary element, comprising: a central hub member for coaxial securement to such rotary element; a generally annular coupling member coaxially rotatably mounted on said hub member; means providing a slippable, frictional driving connection between said hub member and said coupling member; an outer, generally annular, radially resilient inertia member supported upon and coaxially rotatable with said coupling member; and support means supporting said annular inertia member upon said coupling member as aforesaid, including a pair of inwardly extending, rigid spoke members rigidly attached to spaced apart portions of said annular inertia member and each non-rigidly connected at a point adjacent its inner end to spaced apart portions of said coupling member, whereby torsional vibrations transmitted from said coupling member to the inner ends of each said spoke members causes corresponding vibratory radial flexure of the portions of said resilient annular inertia member intermediate said spoke members.

2. A torsional vibration damper for a rotary element, comprising: a central hub member for coaxial securement to such rotary element; a generally annular coupling member coaxially rotatably mounted on said hub member; means providing a slippable, frictional driving connection between said hub member and said coupling member; an outer, generally annular, radially resilient inertia member supported upon and coaxially rotatable with said coupling member; support means supporting said annular inertia member upon said coupling member as aforesaid, including a pair of diametrically opposite, inwardly extending, rigid spoke members rigidly attached to said annular inertia member and each non-rigidly connected at a point adjacent its inner end to diametrically opposite portions of said coupling member, whereby torsional vibrations transmitted from said coupling member to the inner ends of each said spoke members causes corresponding vibratory radial flexure of the portions of said resilient annular inertia member intermediate said spoke members; and means adjustable to vary the friction of said frictional driving connection.

3. A torsional vibration damper for a rotary element, comprising: a central hub member for coaxial securement to such rotary element; a generally annular coupling member coaxially rotatably mounted on said hub member; means providing a slippable, frictional driving connection between said hub member and said coupling member; an outer inertia member supported upon and coaxially rotatable with said coupling member, said inertia member including a pair of coaxial, diametrically opposite, arcuate portions having substantial resilient flexibility in bending transverse to their circumferential axes; and support means supporting said inertia member upon said coupling member as aforesaid, including a pair of diametrically opposite, inwardly extending, rigid spoke members rigidly attached to said inertia member intermediate the ends of each said arcuate portions thereof and each such spoke member non-rigidly connected at a point adjacent its inner end to diametrically opposite portions of said coupling member, whereby torsional vibrations transmitted from said coupling member to the inner ends of each of said spoke members causes corresponding vibratory transverse flexure of the opposite, arcuate portions of said inertia member intermediate said spoke members.

4. A torsional vibration damper for a rotary element, comprising: a central hub member for coaxial securement to such rotary element; a generally annular coupling member coaxially rotatably mounted on said hub member; means providing slippable, frictional driving connection between said hub member and said coupling member; an outer, generally annular inertia member supported upon and coaxially rotatable with said coupling member, said inertia member including a pair of coaxial, diametrically opposite, arcuate portions having substantial resilient flexibility in bending transverse to their circumferential axes; and support means supporting said annular inertia member upon said coupling member as aforesaid, including a pair of diametrically opposite, inwardly extending, rigid spoke members rigidly attached to said annular inertia member intermediate the ends of each said arcuate portions thereof, and each such spoke member non-rigidly connected at a point adjacent its inner end to diametrically opposite portions of said coupling member, whereby torsional vibrations transmitted from said coupling member to the inner ends of each of said spoke members causes corresponding vibratory transverse flexure of the opposite arcuate portions of said resilient annular inertia member intermediate said spoke members.

5. A torsional vibration damper for a rotary element, comprising: a central hub member for coaxial securement to such rotary element; an inertia member supported upon and rotatable with said hub member, said inertia member including a pair of diametrically opposite, arcuate portions having substantial resiliency in bending transverse to their circumferential lengths; and support means supporting said inertia member upon said hub member as aforesaid, including a pair of diametrically opposite, inwardly extending, rigid lugs each rigidly attached to said inertia member adjacent the ends of each said arcuate portion thereof and each such lug being non-rigidly connected at a point adjacent its inwardly extending end to diametrically opposite portions of said hub member, whereby torsional vibrations in said hub member are transmitted from said hub member tangentially to the inwardly extending end portions of each of said lugs, thereby causing corresponding vibratory transverse flexure of the opposite arcuate portions of said inertia member intermediate said lugs.

6. A torsional vibration damper for a rotary element, comprising: a central hub member for coaxial securement to such rotary element; an inertia member attached to and rotatable with said hub member, said inertia member including an elongated portion having substantial resiliency in transverse bending; and attachment means attaching said inertia member to said hub member as aforesaid, including a pair of spaced apart, generally radially extending, rigid lug members each rigidly attached adjacent one end thereof to spaced apart portions of said elongated inertia member and non-rigidly connected adjacent its other end to said hub member, whereby vibratory torsional accelerations in said hub member are transmitted therefrom to the connected end portions of each of said lug members, thereby causing corresponding vibratory transverse flexure of the said elongated portion of said inertia member intermediate said lug members.

7. In a torsional vibration damper for a body subject to torsional vibrations about an axis thereof: a substantially resiliently flexible unitary inertia mass; and means to restrain the motion of said mass and said body relative to one another substantially to transverse vibrational flexure of said mass, resulting from said torsional vibrations, about at least two, spaced apart centers fixed to said body eccentric to its said axis.

8. In a torsional vibration damper for a body subject to torsional vibrations about an axis thereof: a substantially resiliently flexible unitary inertia mass; and means to restrain the motion of said mass and said body relative to one another substantially to transverse vibrational flexure of said mass about at least two, spaced apart centers fixed to said body eccentric to both its said axis and the center of gravity of said mass.

9. A torsional vibration damper for a rotary element, comprising: a central hub member for coaxial securement to such rotary element; an outer inertia member supported upon and coaxially rotatable with said hub member, said inertia member including a pair of coaxial, diametrically opposite, arcuate portions each formed with a circumferentially extending, arcuate slot therein intermediate its inner and outer surfaces, whereby said arcuate portions have substantial resiliency in bending transverse to their circumferences; and support means supporting said inertia member upon said hub member as aforesaid, including a pair of diametrically opposite, inwardly extending, rigid lugs rigidly attached to said inertia member adjacent the ends of each said arcuate portions thereof and adjacent the ends of said arcuate slots therein, and each such lug being non-rigidly connected at a point adjacent its inner end to diametrically opposite portions of said hub member, whereby torsional vibratory forces in said hub member are transmitted from said hub member tangentially to the inner end portions of each of said lugs and thereby causes corresponding vibratory transverse flexure of the opposite arcuate portions of said inertia member intermediate said lugs.

10. A torsional vibration damper for a rotary element, comprising: a central hub member for coaxial rotation with such rotary element; an inertia member supported upon and coaxially rotatable with said hub member, said inertia member including a plurality of relatively radially thin end to end joined arcuate portions forming a generally annular body, said arcuate portions having flexibility in bending transverse to the circumference of said annular body; and support means supporting said annular body upon said hub member as aforesaid, including a plurality of lugs attached rigidly to said annular body each at points intermediate adjacent end portions of said arcuate portions and extending inwardly therefrom, and attachment means attaching the inner end portions of each of said lugs to said hub member, said attachment being such as to permit pivotal motion of said lugs relative to said hub member in planes parallel with the plane of said annular body, whereby torsional vibrations in said hub member are transmited from said hub member through said attachment means tangentially to the inner end portions of each said lugs and thereby introduce corresponding vibratory transverse bending moments in said arcuate portions of said inertia member.

11. A torsional vibration damper for a rotary element, comprising: a central hub member for coaxial rotation with such rotary element; an inertia member supported upon and coaxially rotatable with said hub member, said inertia member including a plurality of relatively radially thin, coaxial, radially spaced apart, end to end joined arcuate portions forming a generally annular assembly, said arcuate portions having substantial flexibility in bending transverse to the circumference of such annular assembly; and support means supporting said annular body upon said hub member as aforesaid, including a plurality of lugs attached rigidly to said annular assembly each at points intermediate adjacent end portions of said arcuate portions and extending inwardly therefrom, and attachment means attaching the inner end portions of each of said lugs to said hub member, said attachment means being such as to permit pivotal motion of said lugs relative to said hub member in planes parallel with the plane of said annular body, whereby torsional vibrations in said hub member may be transmitted from said hub member through said attachment means tangentially to the inner end portions of each of said lugs and introduce corresponding vibratory transverse bending moments in each of said arcuate portions of said generally annular assembly.

12. A torsional vibration damper for a rotary element, comprising: a central hub member for coaxial securement to such rotary element; a generally annular coupling member coaxially rotatably mounted on said hub member; means providing a slippable, frictional driving connection between said hub member and said coupling member; an inertia member supported upon and coaxially rotatable with said coupling member, said inertia member including a plurality of relatively radially thin, end to end joined arcuate portions forming a generally annular inertia assembly, said arcuate portions having resilient flexibility in bending transverse to the circumference of such annular inertia assembly; and support means supporting said annular inertia assembly upon said coupling member as aforesaid, including a plurality of lugs attached rigidly to said annular inertia assembly each at points intermediate adjacent end portions of said arcuate portions and extending inwardly therefrom, and attachment means positively attaching the inner end portions of each of said lugs to said coupling member, said attachment means being such as to permit pivotal motion of such lugs relative to said coupling member in planes parallel with the plane of said annular inertia assembly, whereby torsional vibrations in said coupling member are transmitted from said coupling member through said attachment means tangentially to the inner end portions of each of said lugs, thereby introducing corresponding vibratory transverse bending moments in said arcuate portions of said annular inertia assembly.

13. A torsional vibration damper for a rotary element, comprising: a central hub member for coaxial securement to said such rotary element; a generally annular coupling member coaxially rotatably mounted on said hub member; means providing a slippable, frictional driving connection between said hub member and said coupling member; an inertia member supported upon and coaxially rotatable with said coupling member, said inertia member including a plurality of relatively radially thin, end to end joined arcuate portions forming a generally annular inertia assembly, said arcuate portions having resilient flexibility in bending normal to the circumference of such annular inertia assembly; support means supporting said annular inertia assembly upon said coupling member as aforesaid, including a plurality of lugs attached rigidly to said annular inertia assembly each at points intermediate adjacent end portions of said arcuate portions and extending inwardly therefrom, and attachment means positively attaching the inner end portions of each of said lugs to said coupling member, said attachment means being such as to permit pivotal motion of such lugs relative to said coupling member in planes parallel with the plane of said annular inertia assembly, whereby torsional vibrations in said coupling member are transmitted from said coupling member through said attachment means tangentially to the inner end portions of each of said lugs, thereby introducing corresponding vibratory transverse bending moments in said arcuate portions of said annular inertia assembly; and means adjustable to vary the amount of friction of said frictional driving connection.

14. In a torsional vibration damper for a body subject to torsional vibrations about an axis thereof:
a resiliently flexible, unitary annular mass;
and means to restrain the motion of said mass and said body relative to one another substantially to resilient deformation of said annular mass about at least two circumferentially spaced apart centers carried by said body, eccentric to said axis.

15. In a torsional vibration damper for a body subject to torsional vibrations about an axis thereof:
a unitary, substantially resiliently flexible, generally annular mass;
and means substantially coaxially interconnecting said body and said annular mass effective to restrain the motion of said mass and said body relative to one another substantially to vibratory resilient flexure of said annular mass about at least two spaced-apart centers fixed to said body and eccentric to both said axis and the neutral zone of such resilient flexure of said mass.

16. A torsional vibration damper for a rotary element, comprising:
a central coupling member for coaxial securement to such rotary element;
an outer, generally annular, radially resilient inertia member supported upon and substantially coaxially rotatable with said coupling member;
and support means supporting said annular inertia member upon said coupling member as aforesaid, including inwardly extending, rigid spoke members rigidly attached to spaced-apart portions of said annular inertia member and each non-rigidly connected at a point adjacent its inner end to spaced-apart portions of said coupling member,
whereby torsional vibrations transmitted from said coupling member to the inner ends of each of said spoke members causes corresponding vibratory radial flexure of the portions of said resilient annular inertia member intermediate said spoke members.

References Cited in the file of this patent

UNITED STATES PATENTS

| | | |
|---|---|---|
| 1,913,803 | Griswold | June 13, 1933 |
| 2,038,027 | Edwards | Apr. 21, 1936 |
| 2,047,763 | Bacon | July 14, 1936 |
| 2,100,833 | Bruckel et al. | Nov. 30, 1937 |

FOREIGN PATENTS

| | | |
|---|---|---|
| 542,112 | Germany | Jan. 20, 1932 |
| 1,193,057 | France | Apr. 27, 1959 |